United States Patent
Limbach

[11] Patent Number: 5,732,907
[45] Date of Patent: Mar. 31, 1998

[54] EJECTION SEAT BUCKLE

[75] Inventor: John F. Limbach, Aurora, Colo.

[73] Assignee: Capewell Components Company Limited Partnership, Cromwell, Conn.

[21] Appl. No.: 574,381

[22] Filed: Dec. 18, 1995

[51] Int. Cl.[6] ................................................. B64D 25/115
[52] U.S. Cl. .................... 244/122 AG; 244/122 B; 297/466; 297/467
[58] Field of Search ................ 244/122 R, 122 A, 244/122 AG, 122 B, 121; 297/464, 466, 467, 468, 484, 486

[56] References Cited

U.S. PATENT DOCUMENTS

| | | | |
|---|---|---|---|
| H115 | 8/1986 | Lorch | 244/122 B X |
| 3,074,669 | 1/1963 | Bohlin | 244/122 AG |
| 3,202,384 | 8/1965 | Martin | 244/122 AG |
| 3,329,464 | 7/1967 | Barwood et al. | 244/122 B |
| 3,957,231 | 5/1976 | Miller et al. | 244/122 AG |
| 4,179,086 | 12/1979 | Yamada | 244/122 B X |
| 4,215,835 | 8/1980 | Wedgwood | 244/122 AG |
| 4,462,563 | 7/1984 | Specker et al. | 244/122 AG |
| 4,606,552 | 8/1986 | Hultqvist | 244/122 B X |
| 5,072,897 | 12/1991 | Aronne | 244/122 AG |
| 5,415,366 | 5/1995 | Mastrolia | 244/122 AG |

OTHER PUBLICATIONS

"Lap Belt for a B-1 Bomber" Exact publication date is unknown but believed to be prior to Dec. 18, 1994.

*Primary Examiner*—William Grant
*Attorney, Agent, or Firm*—Alix, Yale & Ristas, LLP

[57] ABSTRACT

An ejection seat buckle assembly and an arm restraint system incorporating such a buckle assembly wherein the buckle of the assembly includes latch and strike portions each having a respective cable guide ring integrally formed therewith. Arm restraint cables passing through the guide rings deploy safety nets or pull the sleeves or arms of an occupant inward toward the occupant's torso or lap to prevent arm injury during seat ejection from an aircraft. In one embodiment, the guide rings are formed integrally with the latch and strike portions by forming generally oval shaped openings in lap belt adjusters mounted to respective latch and strike engagement portions by latch hinges. In another embodiment, the cable guide rings are D-shaped rings integral with the latch and strike of the ejection seat buckle.

19 Claims, 3 Drawing Sheets

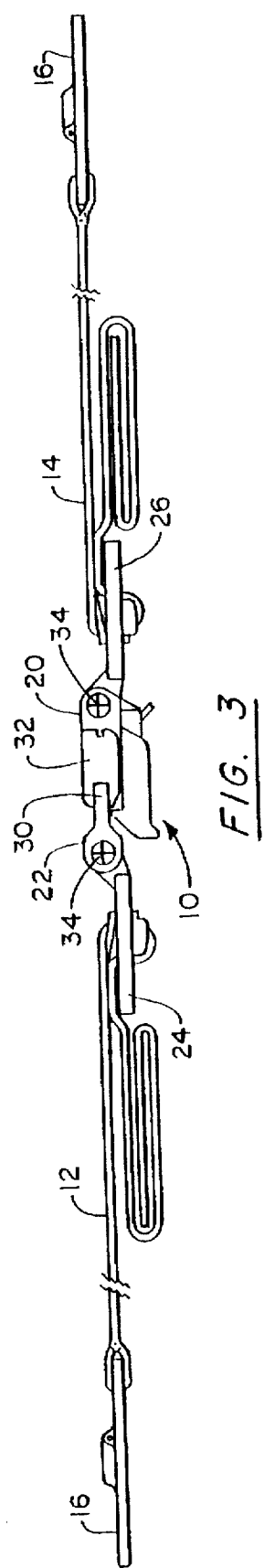
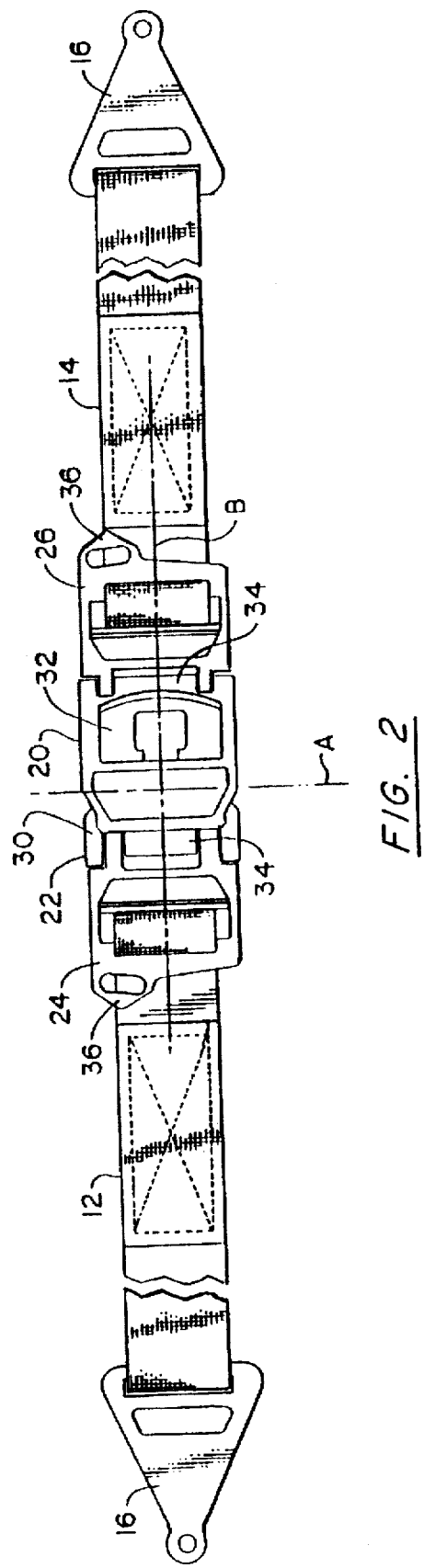
FIG. 3
FIG. 2

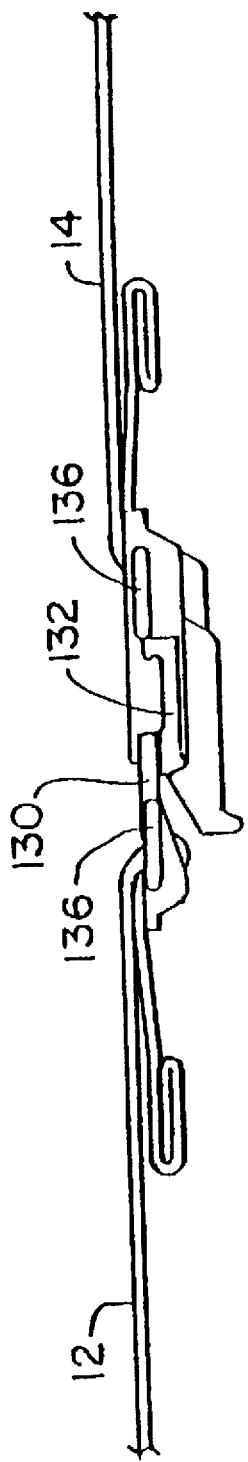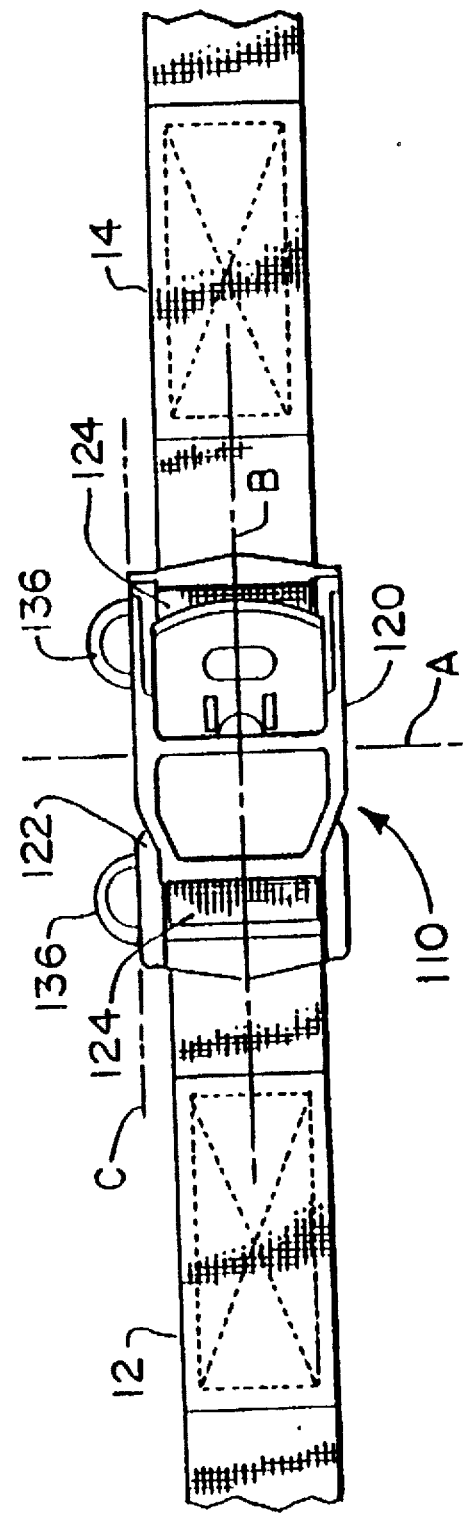

EJECTION SEAT BUCKLE

BACKGROUND OF THE INVENTION

Arm-restraint systems are known in the art of aircraft ejection seats to restrain the arms of a seat occupant from being struck by cockpit components during an emergency ejection procedure. Prior designs have employed cables attached to the arms or sleeves of a seat occupant to draw the arms into the torso or lap of the seat occupant to prevent them from injury during the ejection procedure. Other previous designs have employed safety curtains or nets attached to the seat that envelope the arms in the ejection procedure. These nets also direct the arms toward the torso or lap of the seat occupant.

Ejection seats conventionally employ a lap belt for assisting in securing the seat occupant to the ejection seat. Arm restraint cables attached to the sleeves or net are run downwardly through guide rings sewn onto the lap belt. During the seat ejection procedure, the arm-restraint cables are drawn through the guide rings and down between the legs of the seat occupant. Arm restraint cable motion deploys the safety nets or pulls the sleeves or arms to draw the arms of the seat occupant toward the occupant's torso or lap to prevent arm injury as the seat exits the aircraft.

An important feature in the safety of an arm-restraint system is the positioning of the arms close to the centerline of the body of the seat occupant in order that they are least exposed to striking an object during the ejection procedure.

It is an object of the invention to provide a new and improved ejection seat buckle having cable guide rings located to provide improved positioning of the arms during the ejection procedure.

It is another object of the invention to provide a new and improved ejection seat buckle having integral cable guide rings that do not require the addition of rings to the lap belt.

It is a further object of the invention to provide an ejection seat buckle having cable guide rings that direct the arm-restraint cable movement in an improved manner.

These and other objects of the invention will be recognized in the following specification and drawings.

BRIEF DESCRIPTION OF THE DRAWINGS

The present invention may be better understood and its numerous objects and advantages will become obvious to those skilled in the art by reference to the accompanying drawings wherein like reference numerals refer to like elements in the several figures and in which:

FIG. 2 is a front view, partially broken away, of a lap belt assembly of the ejection seat of FIG. 1 and showing the ejection seat buckle in greater detail;

FIG. 3 is a top view, partially broken away, of the lap belt assembly of FIG. 2;

FIG. 4 is a front view, partially broken away, of a lap belt assembly incorporating a second embodiment of an ejection seat buckle of the present invention; and FIG. 5 is a top view, partially broken away, of the lap belt assembly of FIG. 4.

DETAILED DESCRIPTION OF THE PREFERRED EMBODIMENT

Figure 1:
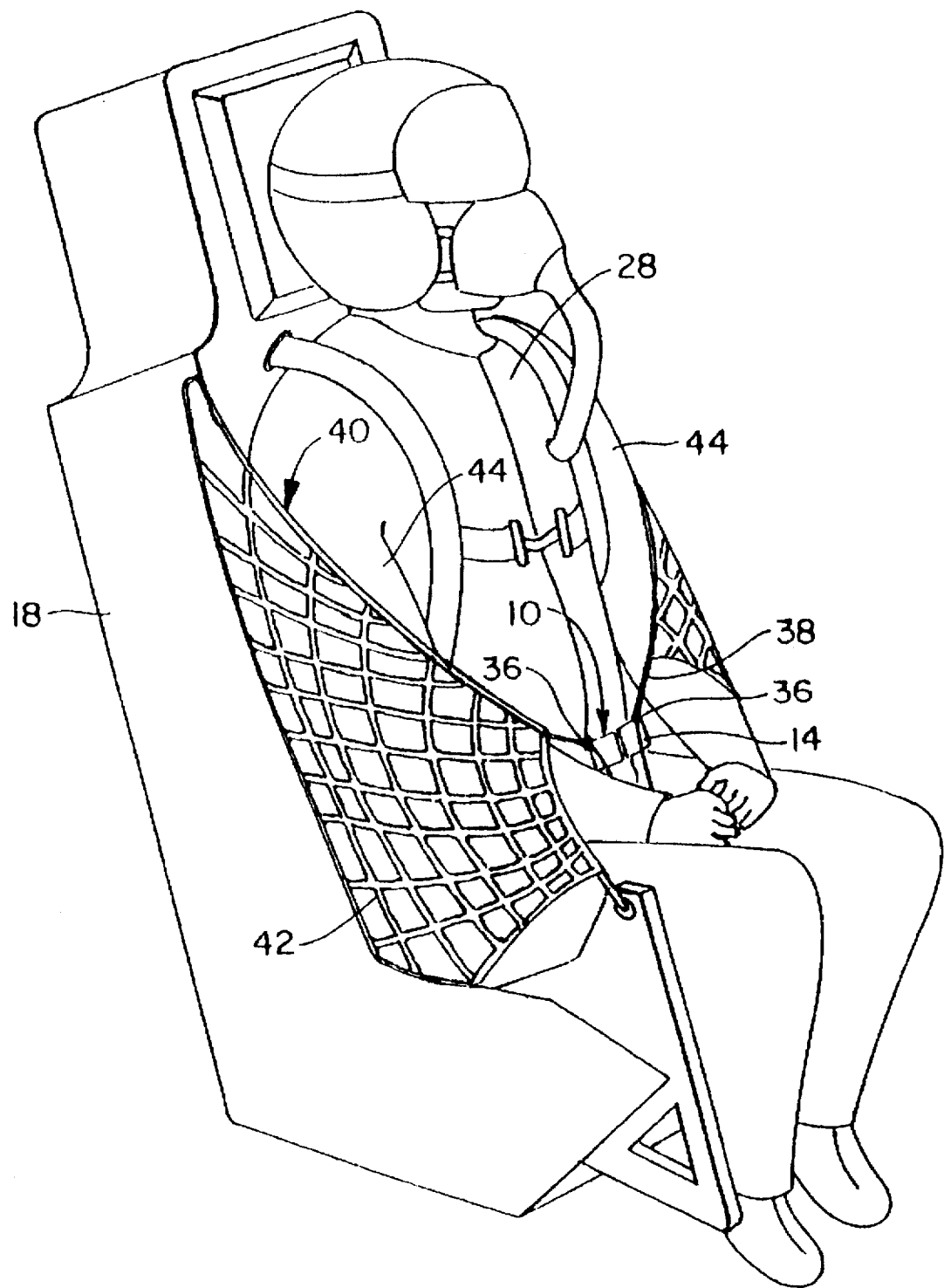
FIG. 1 is a perspective view of an aircraft ejection seat having a seat occupant and a deployed arm-restraint system with a first embodiment of an ejection seat buckle incorporating the present invention.

With reference to FIGS. 1, 2 and 3, wherein like numerals represent like parts throughout the figures, an ejection seat buckle is generally represented by the numeral 10. The ejection seat buckle 10 is used to manually connect and release two halves 12, 14 of a lap belt. The outer ends of each half 12, 14 of the lap belt are affixed to mounting links 16. The mounting links 16 are permanently attached to the aircraft ejection seat 18.

The ejection seat buckle 10 comprises a latch 20 and a strike 22. The latch 20 and strike 22 laterally engage to connect the lap belt halves 12, 14. The engagement of the latch 20 and strike 22 can be by any manner well-known in the art. The latch 20 comprises a latch engagement portion 30 and the strike 22 comprises a strike engagement portion 32. The latch engagement portion 30 and strike engagement portions 32 selectively releasably engage and disengage to respectively provide locking and unlocking of the lap belt halves 12, 14. The engaged ejection seat buckle 10 and lap belt halves 12, 14 serve to at least partially support a seat occupant 28 in the ejection seat 18.

The ejection seat buckle 10 preferably includes a plurality of lap belt adjusters 24, 26. The lap belt adjusters 24, 26 permit adjustment of the length of each lap belt half 12, 14 to compensate for differences in the size of a seat occupant 28 in the aircraft ejection seat 18.

The lap belt adjusters 24, 26 are mounted to the latch engagement portion 30 and strike engagement portion 32 of the ejection seat buckle 10 by latch hinges 34. Each lap belt half 12, 14 is laced through the respective lap belt adjuster 24, 26 to permit adjustment of the length the lap belt half 12, 14. It should be recognized that the ejection seat buckle 10 can be constructed without lap belt adjusters 24, 26. Instead, lap belt adjustment may be provided at the mounting links 16 or at an intermediate position along the length of the lap belt halves 12, 14 (not shown).

Integral with the ejection seat buckle 10 are a pair of cable guide rings 36. A cable guide ring 36 is provided on the latch 20. A second cable guide ring 36 is provided on the strike 22. In the preferred embodiment of the invention, the cable guide rings 36 are integrally formed with the lap belt adjusters 24. The cable guide rings 36 are furthermore preferably equidistantly placed from the transverse centerline A of the ejection seat buckle 10. The cable guide rings 36 are further preferably positioned above a longitudinal centerline B of the ejection seat buckle 10. The cable guide rings 36 define a generally oval shaped opening for smooth and efficient guiding of the arm restraint cables 38. The cable guide rings 36 are preferably planar with the latch 20 and strike 22 so as to cause the least amount of interference to the seat occupant 28 and with the normal use of the lap belt (see FIG. 3).

An arm restraint system 40, mounted on the aircraft ejection seat 18, comprises a pair of nets or curtains 42 and a pair of arm-restraint cables 38 (see FIG. 1). The nets 44 are attached to the outside edge of the ejection seat 18 along a line generally parallel to the torso of the seat occupant 28. Arm-restraint cables 38 are affixed to the net and are positioned over each arm 44 of the occupant 28 and pass through one of the cable guide rings 36. The cables then continue between the legs of the seat occupant and are attached to the floor or other device in the aircraft cockpit (not shown). The arm-restraint cables are maintained in these positions during normal aircraft flight.

During the seat ejection procedure, the arm-restraint cables 38 are drawn through the cable guide rings 36 to deploy the nets 42 around the arms 44 of the seat occupant 28. The nets 42 force the arms 44 into the lap of the seat occupant 28. The location of the cable guide rings 36 near the traverse centerline A of the ejection seat buckle 10 results in improved positioning of the arms 44 of the seat occupant 28 into the lap of the seat occupant during the ejection process.

It should be recognized that the arm-restraint cables may be directly attached to the arms 44 of the seat occupant 28. The ejection seat buckle 10 will provide improved arm positioning with such an arrangement.

In an alternate embodiment of the invention, the ejection seat buckle 110 comprises a latch 120 and a strike 122. Lap belt adjusters 124 are provided integral with a latch engagement portion 132 and a strike engagement portion 130 of the ejection seat buckle 110. The cable guide rings 136 are D-shaped rings integral with the ejection seat buckle latch 120 and ejection seat buckle strike 122. The cable guide rings 136 extend above a line C defined by the upper edge of the ejection seat buckle 110. Similar to the embodiment 10, the cable guide rings 136 are generally coplanar with the body of the ejection seat buckle 110 and are preferably equidistantly positioned from the transverse centerline A of the ejection seat buckle 10.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

I claim:

1. An improved ejection seat belt buckle assembly for connecting two halves of a laterally extending lap belt of an aircraft ejection seat having an arm restraint system with arm restraint cables connected for restraining the arms of a seat occupant against certain movement during seat ejection, the buckle assembly having a latch component and a strike component adapted to be laterally engaged and disengaged for locking and unlocking the buckle assembly for respectively locking and releasing the lap belt halves, the buckle assembly further defining a transverse centerline; the improvement wherein the latch component has a first cable guide ring integrally formed therewith and the strike component has a second cable guide ring integrally formed therewith, the first and second guide rings, when the buckle assembly is closed, being laterally spaced a fixed predetermined distance on opposite lateral sides of the transverse centerline of the buckle assembly for receiving and guiding the arm restraint cables.

2. The seat belt buckle assembly of claim 1 wherein each of said cable guide rings defines a D-shaped opening.

3. The seat belt buckle assembly of claim 1 wherein said buckle assembly is generally planar, and said cable guide rings are in said plane of said buckle assembly.

4. The seat belt buckle assembly of claim 1 wherein said buckle assembly further comprises a lap belt, said lap belt defines a longitudinal axis, and said cable guide rings are above said longitudinal axis.

5. The seat belt buckle assembly of claim 1 wherein said latch component comprises a latch engagement portion and a first belt adjuster means for adjusting the length of said lap belt, wherein said strike component comprises a strike engagement portion and a second belt adjuster means for adjusting the length of said lap belt, and wherein said cable guide rings are rigidly integral with said first and second belt adjuster means.

6. The seat belt buckle assembly of claim 5 wherein said first and second belt adjuster means are hingedly mounted to said respective strike engagement portion and latch engagement portion.

7. An improved aircraft seat belt buckle for selectively connecting two halves of a lap belt, said buckle for an ejectable airplane seat having an arm restraint system for having arm restraint cables drawing a flight personnel's arms down into the seat, said buckle having a latch member and a strike member adapted for selective connection wherein the improvement comprises:

said latch member further comprising a latch engagement portion and a first belt adjuster;

a first arm restraint cable guide ring rigidly integral with said first belt adjuster;

said strike member comprising a strike engagement portion and a second belt adjuster; and a second arm restraint cable guide ring rigidly integral with said second belt adjuster.

8. The seat belt buckle of claim 7 wherein said latch engagement portion and said first belt adjuster are hingedly attached, and said strike engagement portion and said second belt adjuster are hingedly attached.

9. The seat belt buckle of claim 7 wherein said buckle defines a transverse axis and each said cable guide ring is equidistantly fixed a lateral distance from the axis.

10. An arm restraint system for an aircraft ejection seat comprising:

arm restraint means for restraining the arms of an occupant of said seat comprising a plurality of arm restraint cables;

a pair of lap belt halves mounted to said seat;

an ejection seat buckle for selectively releasably engaging said lap belt halves comprising a latch mounted to one of said lap belt halves and a strike mounted to the other of said lap belt halves; and a guide ring integral with each said latch and said strike, said cables being positioned through said rings.

11. The arm restraint system of claim 10 wherein said arm restraint means further comprises nets mounted to said seat and said cables are mounted to said nets.

12. The arm restraint system of claim 10 wherein said strike and said latch define a transverse axis and said cable guide rings are equidistantly positioned from said transverse axis.

13. The arm restrain system of claim 12 wherein said strike and said latch each comprise a belt adjuster and said cable guides are mounted to said belt adjusters.

14. The arm restrain system of claim 10 wherein each said cable guide ring defines a D-shaped opening.

15. The arm restraint system of claim 14 wherein said strike and said latch define longitudinal axis and said cable guide rings are above said longitudinal axis.

16. An arm restraint system for an aircraft ejection seat for restraining the arms of an ejecting seat occupant during seat ejection from an aircraft comprising:

an aircraft ejection seat;

arm restraint means comprising a plurality of arm restraint cables for restraining the arms of an occupant in said seat;

a pair of lap belt halves each having a length and mounted to said seat; and an ejection seat buckle for selectively releasably engaging said lap belt halves comprising a latch having a latch portion and a latch belt adjuster portion, for adjusting the length of one of said lap belt halves, mounted to said one of said lap belt halves and a latch cable guide ring integral with said latch belt adjuster portion, and a strike selectively engageable to said latch, said strike having a strike portion and a strike belt adjuster portion, for adjusting the length of the other said lap belt halve, mounted to the other said lap belt halve and a strike cable guide ring integral with said strike belt adjuster portion, said arm restraint cables being positioned through said strike and latch cable guide rings.

17. The arm restraint system of claim 16 wherein said buckle defines a transverse axis and said cable guide rings are equidistantly spaced from said transverse axis.

18. The arm restraint system of claim 17 wherein said buckle defines a longitudinal axis and said cable guide rings are above said longitudinal axis.

19. The arm restraint system of claim 18 wherein each said cable guide ring defines a D-shaped opening.

* * * * *